US 12,403,655 B2

(12) United States Patent
Glass et al.

(10) Patent No.: US 12,403,655 B2
(45) Date of Patent: Sep. 2, 2025

(54) WAX BASE FOR AN OBJECT IN ADDITIVE MANUFACTURING

(71) Applicant: Tritone Technologies Ltd., Rosh HaAyin (IL)

(72) Inventors: Boaz Glass, Kfar Saba (IL); Eli Kedar, Beit-Dagan (IL)

(73) Assignee: Tritone Technologies Ltd., Rosh HaAyin (IL)

( * ) Notice: Subject to any disclaimer, the term of this patent is extended or adjusted under 35 U.S.C. 154(b) by 164 days.

(21) Appl. No.: 17/926,688

(22) PCT Filed: May 20, 2021

(86) PCT No.: PCT/IL2021/050585
§ 371 (c)(1),
(2) Date: Nov. 21, 2022

(87) PCT Pub. No.: WO2021/234707
PCT Pub. Date: Nov. 25, 2021

(65) Prior Publication Data
US 2023/0191698 A1 Jun. 22, 2023

Related U.S. Application Data

(60) Provisional application No. 63/027,978, filed on May 21, 2020.

(51) Int. Cl.
B29C 67/00 (2017.01)
B29C 33/38 (2006.01)
(Continued)

(52) U.S. Cl.
CPC ............ *B29C 64/245* (2017.08); *B29C 33/38* (2013.01); *B33Y 30/00* (2014.12)

(58) Field of Classification Search
CPC . B29C 64/153; B29C 64/259; B29C 35/0805; B29C 41/34; B33Y 30/001; B33Y 40/00
See application file for complete search history.

(56) References Cited

U.S. PATENT DOCUMENTS 5,031,120 A * 7/1991 Pomerantz ............. B33Y 50/02
425/174
6,554,600 B1 * 4/2003 Hofmann ................ B29C 41/34
425/182
(Continued)

FOREIGN PATENT DOCUMENTS

CA 2698189 7/2016
EP 3231579 10/2017
(Continued)

OTHER PUBLICATIONS

International Search Report and the Written Opinion Dated Sep. 5, 2021 From the International Searching Authority Re. Application No. PCT/IL2021/050585. (23 Pages).
(Continued)

*Primary Examiner* — Thu Khanh T. Nguyen

(57) ABSTRACT

A method of forming a base for additive manufacture in order to print an object or part object on the wax base involves forming the wax base on a printing tray. The base is constructed by providing a layer of wax on a surface of said printing tray. The wax is heated to above a melting point thereof so that the wax in contact with the tray is molten, and then the wax is slowly cooled while continually pressing on the wax. The slow cooling ensures a bond between the wax and the printing tray which may be enhanced if the tray surface is roughened.

11 Claims, 7 Drawing Sheets

(51) Int. Cl.
  *B29C 64/245*   (2017.01)
  *B33Y 30/00*    (2015.01)

(56) References Cited

U.S. PATENT DOCUMENTS

| | | | |
|---|---|---|---|
| 10,099,406 | B2 | 10/2018 | Chechik |
| 10,335,994 | B2 | 7/2019 | Napadensky |
| 2007/0187868 | A1* | 8/2007 | Aruga .............. H01L 27/14634 |
| | | | 264/261 |
| 2017/0291372 | A1 | 10/2017 | Milshtein et al. |
| 2018/0207863 | A1 | 7/2018 | Porter et al. |
| 2018/0291199 | A1 | 10/2018 | Miyake |
| 2018/0297114 | A1 | 10/2018 | Preston et al. |
| 2019/0193328 | A1* | 6/2019 | Mantha ................. B33Y 30/00 |
| 2022/0088850 | A1* | 3/2022 | Twiddy .................. B29C 64/40 |

FOREIGN PATENT DOCUMENTS

| | | |
|---|---|---|
| EP | 3181333 | 10/2019 |
| WO | WO2016/149104 | 9/2016 |
| WO | WO 2021/234707 | 11/2021 |

OTHER PUBLICATIONS

International Preliminary Report on Patentability Dated Feb. 15, 2023 From the International Preliminary Examining Authority Re. Application No. PCT/IL2021/050585 (9 Pages).

* cited by examiner

Fig. 1 – Prior Art

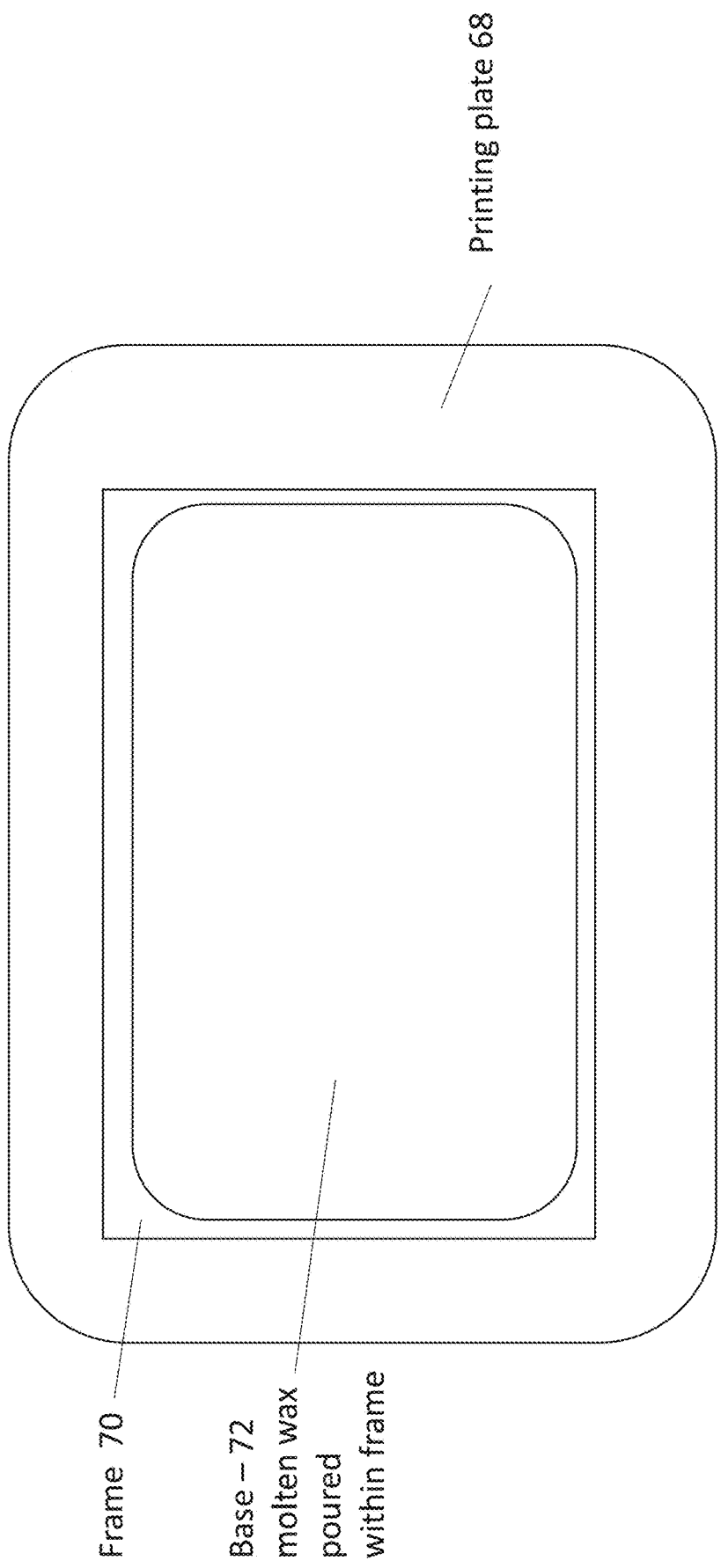

WAX BASE FOR AN OBJECT IN ADDITIVE MANUFACTURING

RELATED APPLICATIONS

This application is a National Phase of PCT Patent Application No. PCT/IL2021/050585 having International filing date of May 20, 2021, which claims the benefit of priority under 35 USC § 119 (e) of U.S. Provisional Patent Application No. 63/027,978 filed on May 21, 2020. The contents of the above applications are all incorporated by reference as if fully set forth herein in their entirety.

FIELD AND BACKGROUND OF THE INVENTION

The present invention, in some embodiments thereof, relates to additive manufacture, also known as 3D printing, and, more particularly, but not exclusively, to such methods that use a wax base over the printing table and underneath the object or part being printed.

The present embodiments relate to any manner of additive manufacture where there is a need for a wax base on which the object is printed. The present applicants have an additive manufacturing system, the details of which are disclosed in International Patent Application No. PCT/IL2018/050475, Molding Method and Apparatus, Particularly Applicable to Metal and/or Ceramics, Published Nov. 8, 2018, the contents of which are hereby incorporated herein by reference, in which wax molds are printed in three dimensions using print nozzles and then liquid material is poured into the mold to form the object or part, thus allowing additive manufacture using materials which cannot normally be supplied using print nozzles, including metals and ceramics.

Such additive manufacturing processes may begin by applying a relatively thick layer, say about 3 to 5 mm thick, of a wax printing base on the machine printing table. The base wax may have characteristics very similar to the inkjet wax used to make the mold for the part itself.

Such a base has several functions and requirements:

The use of a base may ensure that risks of Metal to Metal collisions between the machine sensitive printing mechanisms and the moving metal tables or trays are eliminated. The base ensures that such a collision cannot happen by designing the printing tray top upper plane to be a few millimeters lower than the printing head assembly lowest point, the gap being filled by the wax base.

The gap between the machine tray and the printing plane may thus be filled with a relatively soft wax layer, referred to as a printing base. In the case of a collision between the printing base and the printing head the mechanical damage to the head and its supporting structure is expected to be considerably smaller than would otherwise be if the tray and the print head collided directly.

The model, or the printed wax mold must have good adhesion to the base to allow high build quality and elimination of cracks, bends, etc. As the base material is made from a wax which is very similar to the printing wax, the adhesion between the base and the printing wax is naturally adequate.

The base also needs to be suitable for post-printing/post processing processes where the finished printed mold is disconnected from the machine tray and the wax removal or de-molding process is initiated.

In addition to the above, good adhesion is required between the wax base and the machine tray to in order to eliminate any risk of disconnection between the base and the tray, leading to inaccuracies if not failures in the additive manufacturing process. Furthermore printing requires as simple a base preparation process as possible since additive manufacture is a relatively slow process in any case and any additional time requirements need to be minimized.

A problem however arises due to the fact that the tray is made of aluminum and the printing base is made of wax. The temperature differences in the process cause large stresses both in directions parallel to the tray top plane and peeling stresses that are a very efficient means of disconnecting the wax from the tray. If a disconnect occurs then the object printing process has to stop and may need to be restarted from the beginning. FIG. 1 shows how cracking and warping may occur when a temperature difference appears between a heated bed and cool air passing higher up in the printed layer. As the figure shows, both cracking and warping may occur.

SUMMARY OF THE INVENTION

The present embodiments may provide a simple way to manufacture the wax base, with consideration regarding the bond of the wax base to the tray. The bond may be strong enough to overcome the thermal and mechanical stresses that the base will be subjected to during the model build process, including stresses due to vibrations, heating, cooling, roller pressure, vacuum, etc.

In pursuit of the above, embodiments may use slow cooling of wax in the base, particularly at the wax-aluminum boundary of the tray, to improve adhesion between the wax and the tray. Embodiments may additionally or alternatively sandblast the tray to provide a rough surface finish that allows better adhesion.

In one embodiment molten wax may be poured into a frame and slowly cooled. In another embodiment a single solid layer of wax is placed on the tray which is heated accurately to the wax melting temperature. A thin layer of wax melts at the surface and no more, thus avoiding runoff and the need for a frame, and then cools slowly in order to produce adhesion.

In another embodiment a double layer of wax may be used in which a lower layer, in contact with the tray, has a lower melting point than the upper layer and is heated and then cooled slowly to produce the adhesion. The upper layer does not melt, again avoiding runoff and the need for a surrounding frame.

The top of the base may then be machined flat to provide an accurate reference surface for the printing.

According to an aspect of some embodiments of the present invention there is provided a method of additive manufacture in which an object or part object is printed on a wax base, the method comprising forming the wax base on a printing tray, the method comprising:

placing a layer of wax on a surface of said printing tray, said wax being heated to above a melting point thereof such that wax in contact with said tray is molten; and Slowly cooling said wax while continually pressing on said wax, therewith to form said base.

The placing of the wax may involve applying said layer of wax in solid form and subsequently heating said wax to above said melting point. Alternatively the wax may be poured on in liquid form.

The method may involve using a printing tray wherein said surface of said upper tray is roughened. The roughening may for example be carried out using sandblasting, or the tray may be constructed using unfinished aluminum.

In an embodiment, said base comprises a first layer of wax having a first melting point and a second layer of wax having a second melting point, said first melting point being lower than said second melting point and said first layer being in contact with said surface, said wax being heated to be above said first melting point but below said second melting point.

The method may comprise printing ribs over said wax base to prevent said wax base from warping.

The method may comprise cutting or molding the wax base into a series of full thickness sections separated by thin intervening sections.

The method may comprise printing a frame around said tray, wherein said providing a layer of wax comprising filling an interior of said frame with molten wax.

The method may comprise pressing said wax to said surface while cooling.

In the method, the slow cooling may be carried out over a time period of between half an hour and ten hours.

In embodiments, a layer less than a millimeter in thickness of wax is melted and the cooling is carried out over a time period exceeding one hour.

In embodiments, a layer of at least five millimeters in thickness is melted and said cooling is carried out over a time period exceeding four hours.

According to a further aspect of the present embodiments there is provided a pre-printing construction comprising a tray of a printing machine, a layer of molten wax on an upper surface of said tray, a frame surrounding said molten wax on said tray, and a pressure plate on an opposite side of said molten wax facing said upper surface for pressing said molten wax to said upper surface.

In an embodiment, said upper surface is an aluminum surface.

In an embodiment, said upper surface is unfinished or roughened.

According to a yet further aspect of the present invention, there is provided a pre-printing construction comprising a tray of a printing machine, a first layer of molten wax on an upper surface of said tray, a second layer of solid wax, and a pressure plate on said second layer facing said upper surface for pressing said molten wax to said upper surface.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 6 is a simplified diagram showing a frame containing molten wax for forming the base according to an embodiment of the present invention.

DESCRIPTION OF SPECIFIC EMBODIMENTS OF THE INVENTION

The present invention, in some embodiments thereof, relates to methods of additive manufacture and, more particularly, but not exclusively, to such methods that use a wax base over the printing tray and underneath the object or part being printed. The invention further relates to a pre-printing construction of the base in a printing apparatus.

A base may be formed by pouring molten wax over the metallic surface of the tray and then cooling slowly to improve adhesion of the wax base to the tray. Slow cooling encompasses cooling over a period varying between half an hour and ten hours, and more particularly one hour for a half millimeter of molten layer and four hours for a 5 millimeter molten layer. The use of a roughened surface for the tray improves the bond. The molten wax may be confined with a frame so that a base may form. Alternatively, the molten wax may be replaced with a sheet, block or other form of solid wax, which is placed on the tray and then melted using heat transferred from the base or from any other source of external heat source. Accurate temperature control may ensure that only the wax close to the surface melts. Any need for accurate temperature control may be reduced if two layers of wax, one a low melting point bonding layer and the other a high melting point structural layer, are used, with only the bonding layer at the surface being melted.

Additionally or alternatively, ribs and like strengthening structures, and different types and shapes of base can be made by actually printing the base on the tray using the machine inkjet printing heads, which may be standard 3D printing heads. Such an embodiment uses the printing machine itself to make the bases and eliminates the need for external processes.

Before the actual printing of the wax mold begins, the base may be machined by a cutter. The machined surface may then be used as a very accurate reference to the model build process, and may allow quick and accurate calibration between the model bottom layer and the printing surface without the costs of manufacturing and assembling the original wax base layer with tight tolerances. Additionally or alternatively, the use of the machined base as a reference may allow the machine construction itself to be less accurate. Thus, if the printing tray is not 100% parallel to the printing surface then the base, once machined, is 100% parallel.

Figure 1:
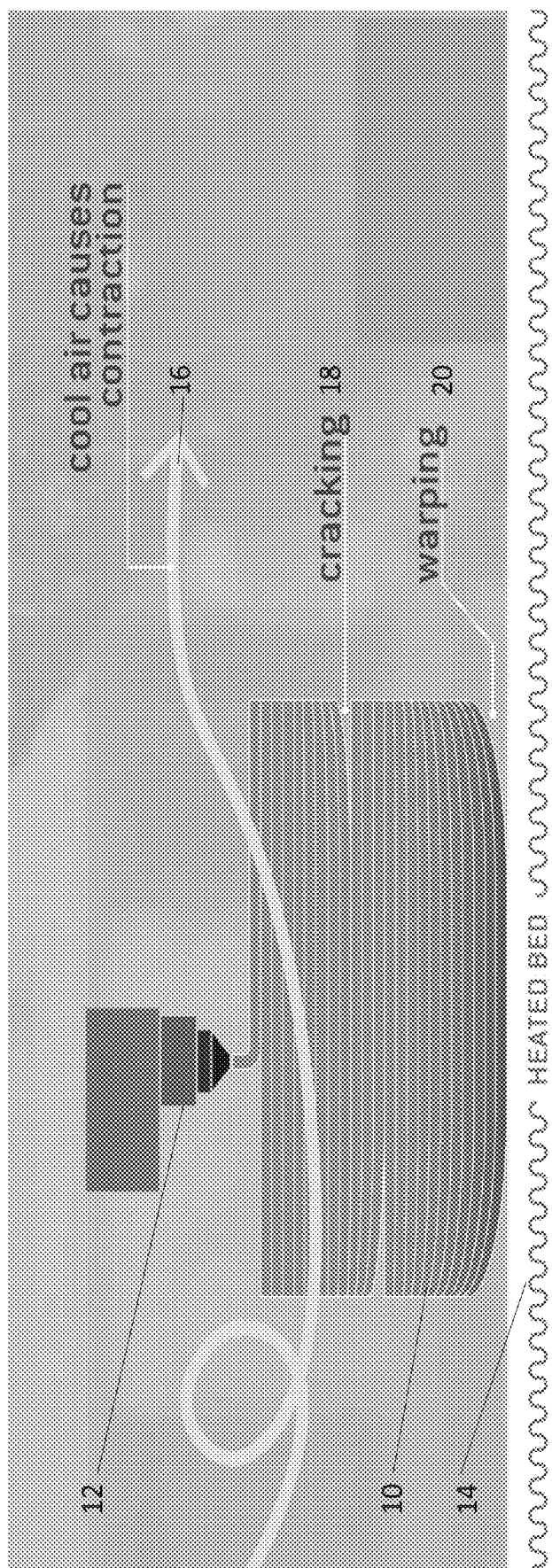
FIG. 1 is a simplified diagram showing two modes of distortion of a prior art wax base on a heated bed.

For purposes of better understanding some embodiments of the present invention, reference is first made to FIG. 1 which illustrates two modes of distortion of a wax base on a heated bed during additive manufacture. Wax base 10 is printed by print head 12 on a heated bed 14. As relatively cold air 16 arrives in a stream, cracking 18 and warping 20 are caused in the base 10.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
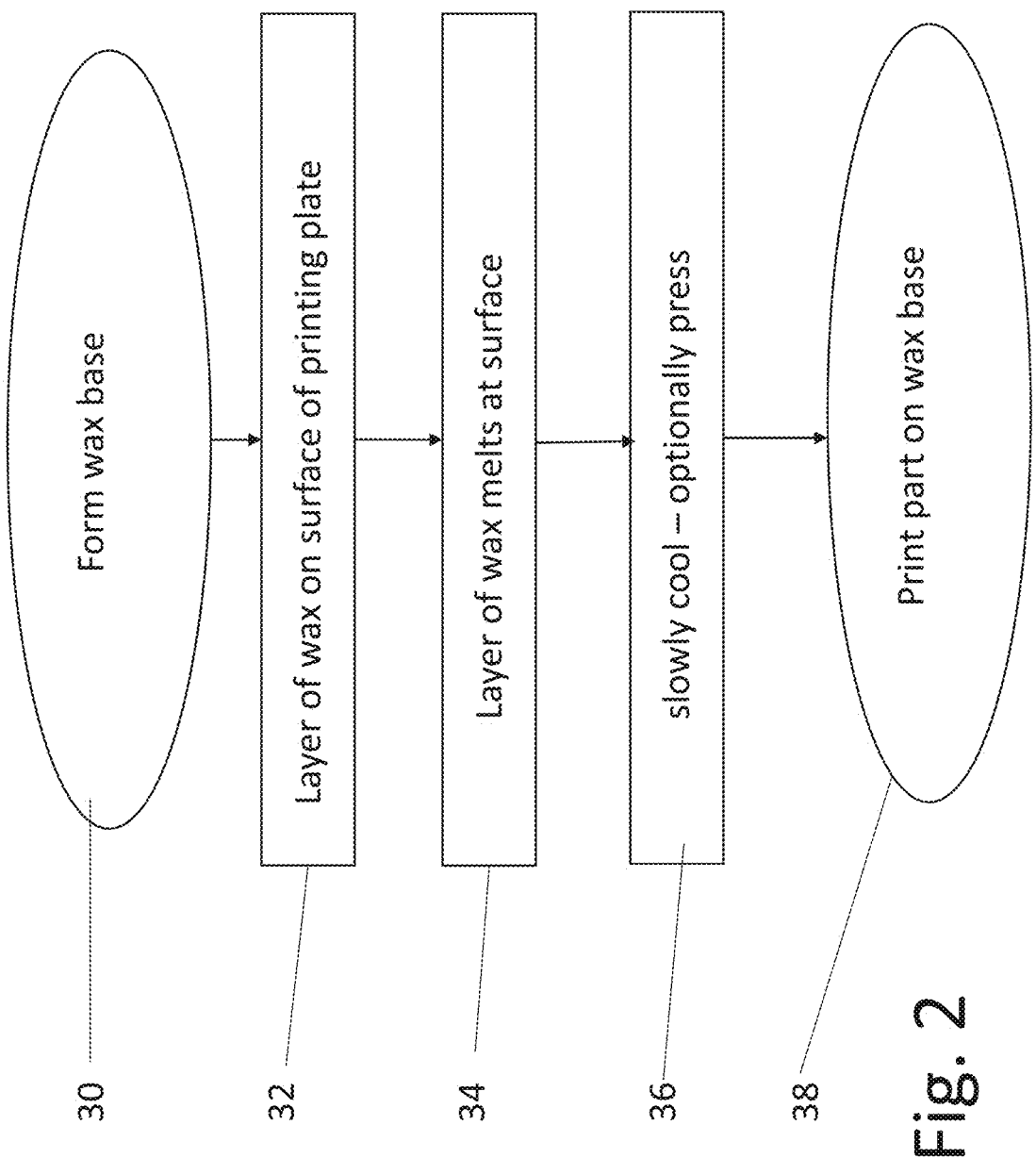
FIG. 2 is a simplified flow chart showing a generalized process for building a base on a printing tray according to embodiments of the present invention.

Referring now to the drawings, FIG. 2 illustrates a method of additive manufacture in which an object or part object is printed on a wax base after the wax base itself is formed on the printing tray. The method 30 involves having a layer of wax on the surface of the printing tray—32. The layer may be all or part of the base and may be placed there in solid form or already molten, as will be discussed.

The layer is kept at such a temperature that at the very least the wax in contact with the surface of the printing tray is at or above the melting point of the wax, so that the tray surface is in contact with molten wax—34.

The wax may optionally be pressed towards the surface from above, say be pressing with a plate, and is slowly cooled 36. The slow cooling of the wax causes the wax to adhere to the surface of the tray, and thus the adherence to the tray resists tendencies to warp. The part may now be printed on the base.

Thus, in one embodiment, a layer of solid wax may be placed over the tray and the wax is then heated. Heating may be such that the entire thickness of the base is melted or just the wax close to the surface.

Pouring or using molten wax over the metallic surface of the tray may require the surface to be leveled and requires a location with a temperature controlled working environment that can be cooled slowly, as moving the tray with the molten wax might be a challenge. Such a pouring process may also require a tightly fitted frame, discussed in greater detail in FIG. 6 below, to prevent the molten wax from spilling out from the desired area.

A method intended to avoid the need for the frame to confine the molten wax is as follows:

(a) The tray is heated to the wax phase change temperature.

(b) A sheet or block of ready-made wax is placed on the heated tray. If the tray has been correctly heated to the phase change temperature, and heating stops once the wax layer is applied, only a thin border layer where the wax touches the tray will actually melt. Furthermore, it may be possible to use pressure from a plate placed over the wax sheet to achieve better contact between the wax sheet and the tray and battle the bending stress created within the wax base due to the temperature difference between the bottom and top layers.

(c) The tray and the wax are cooled slowly in a controlled environment.

In the case where only a thin layer has been melted, typical cooling time may be expected to be 1 hour or more. If all the wax is molten, by contrast, the cooling time may be four hours or more.

The solidifying thin melted wax layer may then act as a bonding layer between the base and the tray.

Figure 3:
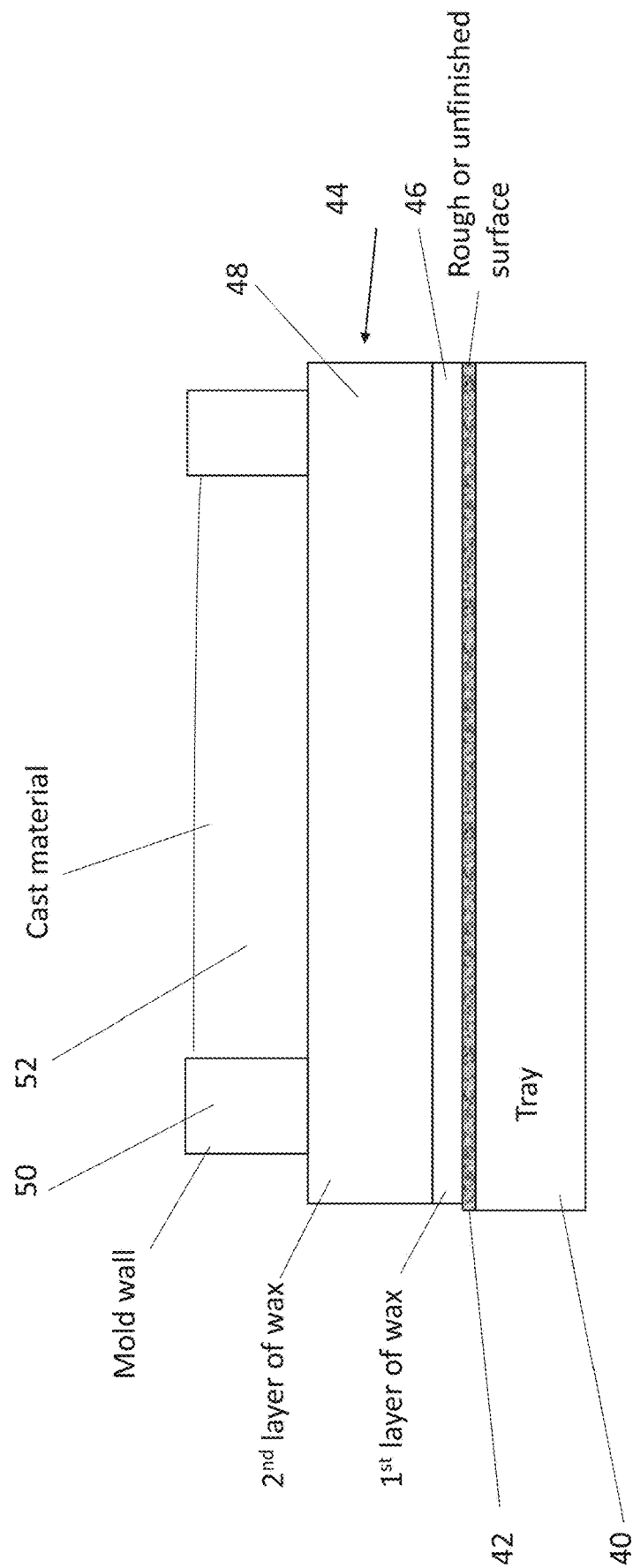
FIG. 3 is a simplified diagram showing a pre-printing construction comprising a base made of two layers of wax which is placed on a roughened or unfinished surface according to embodiments of the present invention.

Reference is now made to FIG. 3, which is a cross sectional view of a pre-printing construction in which the base is constructed on the tray according to one embodiment of the present invention. In order to improve adhesion, the upper surface 42 of printing tray 40 may be unfinished or roughened. Roughening may be carried out using sandblasting.

In an embodiment, the base 44 is made up of two separate layers of wax, a first layer of wax 46 having a first melting point and a second layer of wax 48 having a second melting point. The first melting point is lower than the second melting point. The first layer 46 is in contact with the surface 42. The wax is heated to be above the first melting point but below the second melting point, so that only the wax immediately proximate the tray surface 42 actually melts. Then, as before, slow cooling may be used to achieve adhesion.

It is to be noted that the roughened or unfinished surface and the two layers of wax are two separate embodiments that may be used together or separately.

In greater detail, the method involving the single layer of wax as described in respect of FIG. 2, both removes the need for a frame and reduces the need for leveling of the surface. However the tray needs to be heated to a fairly precise temperature. If the tray temperature is too low the wax made base will not melt and later bond and if the temperature is too high the entire sheet may melt and spill over. Hence, as shown in FIG. 3, an embodiment uses a wax sheet 44 made of two layers—a thin bonding layer 46 with a relatively low phase change temperature and a top structural layer 48 with the regular change phase temperature. The tray temperature still needs to be controlled but the accuracy of the process can be dramatically reduced, and theoretically any temperature above the lower bonding layer phase change temperature and below the upper structural layer phase change temperature will produce a good bond without melting the large mass of the wax in the upper layer.

The process of making a base using two layers of wax, a bonding layer and a structural layer, may be as follows:

(a) the tray is heated to the bonding wax phase change temperature;

(b) a sheet of readymade two-layer wax is placed on the heated tray with the bonding layer, the layer with the lower melting point, touching the heated tray.

(c) the tray and the wax are slowly cooled in a controlled environment, where typical cooling time is 1 hours or more.

As discussed, bonding may be improved by using roughened aluminum or unfinished, or un-treated, aluminum.

Using roughened surfaces may be achieved by sand blasting to obtain a relatively mild surface, or chemical etching to achieve a rougher surface. Alternatively, surfaces may be provided with holes by machining various structures into the aluminum surface of the tray.

Once the base is formed, mold walls 50 may be 3D printed over the base, and cast material 52 may be used to fill in the mold. The cast material dries and the first layer of the part is formed. A second and subsequent layers may be printed over the first layer.

Figure 4:
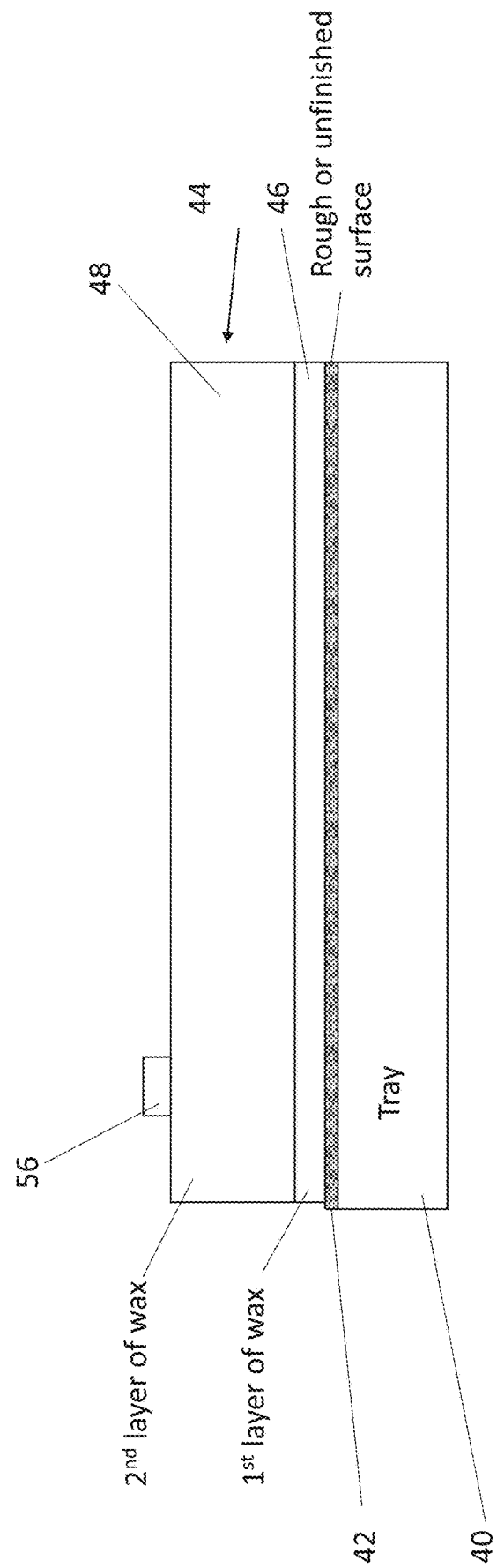
FIG. 4 is a simplified diagram in which a reinforcement structure is added to the base in accordance with an embodiment of the present invention.

Reference is now made to FIG. 4, which shows a pre-printing construction according to a further embodiment of the present invention. Base 44, here shown by way of example on roughened surface 42 and using two wax layers, 46 and 48, has strengthening rib 56 built on a surface thereof. The rib is preferably provided outside the lines of the mold wall and extends over the base to provide stiffening against any tendency to warp. Multiple ribs, or a single annular rib, may be used. The ribs may conveniently be 3D printed by the printing apparatus which is in any event present.

Figure 5:
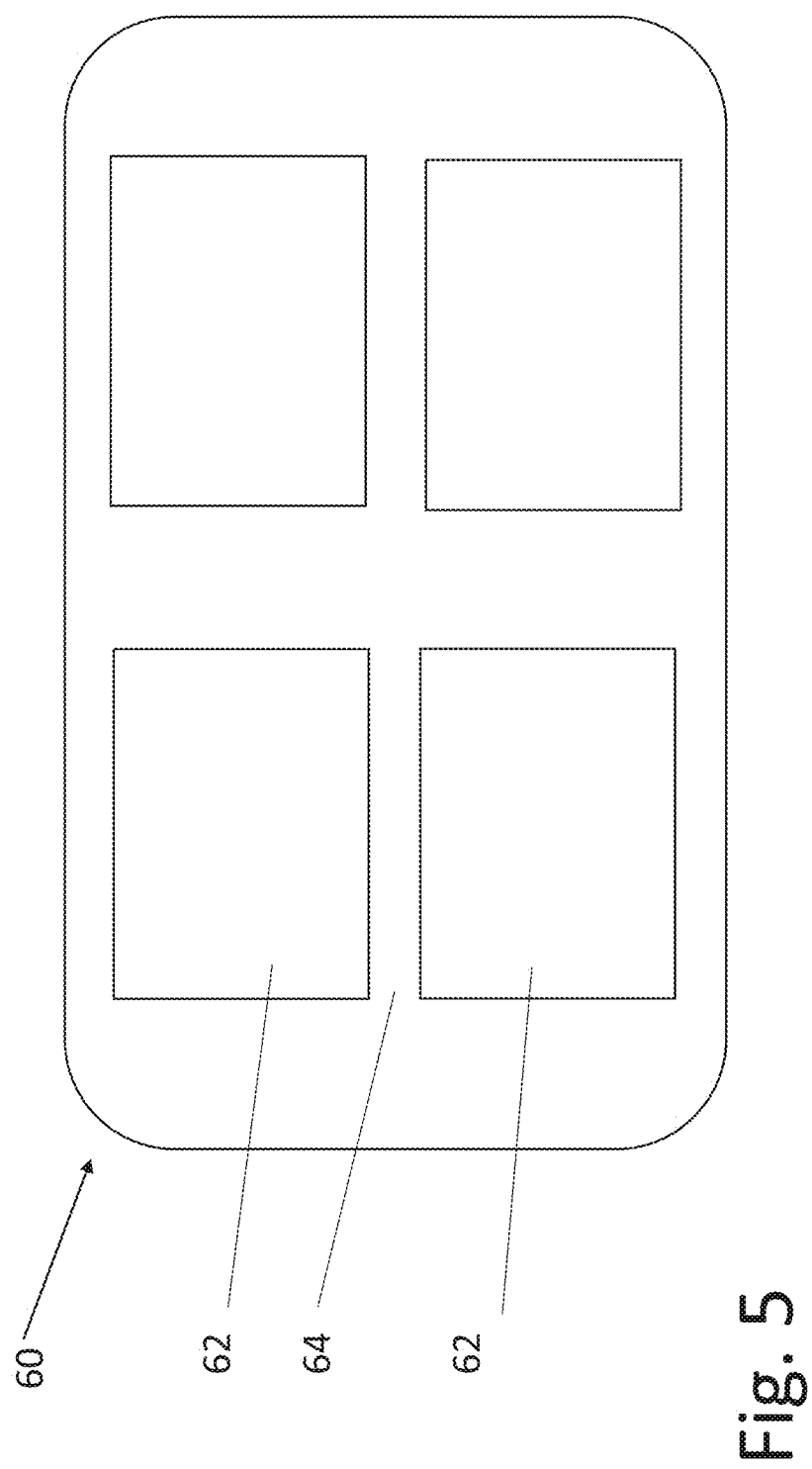
FIG. 5 is a simplified diagram in which the base is made of sections according to an embodiment of the present invention.

Reference is now made to FIG. 5, which is a schematic view from above a pre-printing construction of a base 60 according to a further embodiment of the present invention. The base 60 comprises a series of full depth, or full thickness, sections 62 separated by thinner gaps in between, in the manner of a bar of chocolate. The thinner sections give flexibility to the base and thus allow for prevention of warping or cracking. The embodiment may involve one or two wax layers as preferred and may or may not be used with a roughened tray surface. As a further alternative, the wax base may be made into smaller sections by cutting into separated sections 62 that are simply fitted together. The effect of thermal stress in the wax is reduced as the thin areas or the gaps between the areas are able to absorb changes in overall length, and also do not conduct heat so well, and the overall effected length is smaller.

Reference is now made to FIG. 6, which is a schematic view from above of a pre-printing construction according to a further embodiment of the present invention. As shown, on the printing tray 68, a frame 70 is placed. The frame is simply a closed vertical wall defining the outer shape of the frame. Molten wax is then poured into the interior of the frame to form the base and is slowly cooled as in the previous embodiments.

The frame may be provided as a preformed construct or can be 3D printed by the printing nozzles already present, or may itself be formed by printing a mold and then filling with paste material to make the frame as strong as the part being manufactured.

Thus one embodiment involves printing a frame around the tray, and then the layer of wax is provided by filling the interior of the frame with molten wax. The frame may be printed from the same material as the mold, or the frame may be formed by printing inner and outer frame walls and then filling the interior with paste material and curing.

Still referring to FIG. 6, one way of using a frame is as follows:

(a) Applying a metal or other material frame 70 to the tray 68. The tray may be leveled.

(b) The tray is heated to the wax phase change temperature.

(c) The base wax 70, now in liquid form, is poured on the closed surface of the tray within the frame.

(d) The tray 68 and the wax are slowly cooled in a controlled environment until reaching room temperature. The cooling process may take some four hours.

(e) The frame 70 may be removed after the wax and base have solidified and cooled. The slow cooling process may have positive impact on the base to tray adhesion strength, possibly as a result of a smaller internal stress in the base.

Figure 8:
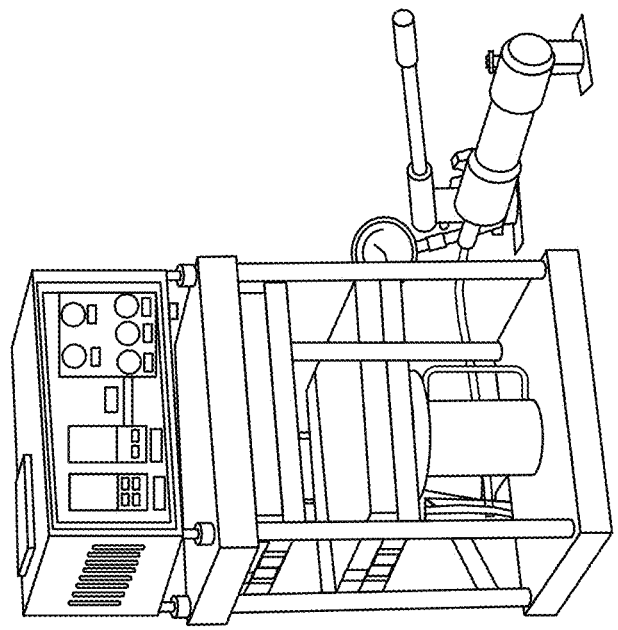
FIGS. 7 and 8 illustrate two different kinds of press that may be used during the cooling process of the present embodiments.
Figure 7:
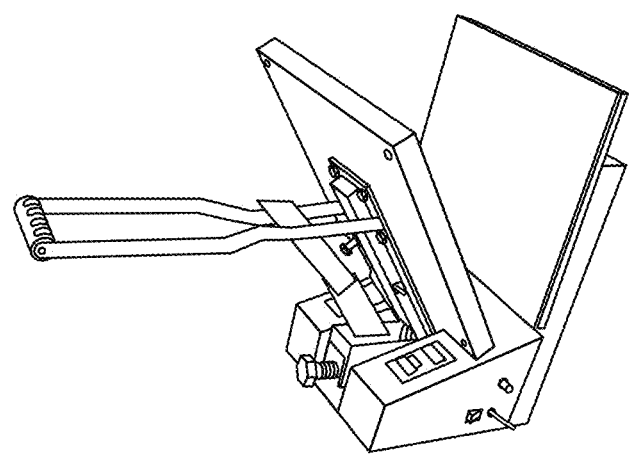

FIGS. 7 and 8 illustrate exemplary presses that may be used in the process of forming the wax base according to the present embodiments. The wax is placed or poured on the base in any of the ways described hereinabove. Then the press is closed to press the wax to the base for the duration of the slow cooling process to ensure adherence of the wax to the tray surface.

In general, it is desirable to have a simple way to bond the wax base to the tray. The bond being provided by the present embodiments may be strong enough to overcome the thermal and mechanical stresses that the base is liable to be subjected to during the model build process, whether due to vibrations, heating, cooling, roller pressure, vacuum, or any other stress source.

Herein, the term "tray" is used for the machine's metal printing tray. The term "printing base" is used for the wax base that is placed on and attached to the tray and on which the part is printed.

As already discussed above, simply involves pouring molten wax over the metallic surface of the tray may create a reasonable bond if the process is controlled correctly, in particular if the cooling is carried out slowly. The use of a roughened surface for the tray improves the bond. The molten wax may be confined with a frame. Alternatively, the molten wax may be replaced with a sheet, block or other form of solid wax, which is placed on the tray and then melted using heat transferred from the base or from any other source of external heat source. Accurate temperature control is needed to ensure that only the wax close to the surface melts, as otherwise the wax would leak away. The need for accurate temperature control is reduced if two layers of wax, one a low melting point bonding layer and the other a high melting point structural layer, are used, with only the bonding layer at the surface being melted.

Additionally or alternatively, ribs and like strengthening structures, and different types and shapes of base can be made by actually printing the base on the tray using the machine inkjet printing heads. Such an embodiment uses the printing machine itself to make the bases and eliminates the need for external processes. As well as printing structures on the base, the process may for example use a pressure wheel to increase the base density or even apply the paste of the mold fill material in order to make sure that the base is of maximum density. The drawbacks of this embodiment are the small head to tray minimal distances. The embodiment may also require good thermal control of the trays while the base buildup is in process.

One embodiment uses the paste of the mold filling material as a structural element in the printing process. The printing of a frame from the mold filling material has already been mentioned and other strengthening structures such as ribs may also be printed in this way. The structures may be quite rigid once dried. The frame may hold the molten wax in place, and ridges may later on fight the tendency of the wax mold to bend under the stresses of the printing process.

It is expected that during the life of a patent maturing from this application many relevant wax, wax-like and other 3D printing technologies will be developed and the scopes of the corresponding and other terms herein are intended to include all new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment and the present description is to be construed as if such embodiments are explicitly set forth herein. Conversely, various features of the invention, which are, for brevity, described in the context of a single embodiment, may also be provided separately or in any suitable subcombination or may be suitable as a modification for any other described embodiment of the invention and the present description is to be construed as if such separate embodiments, subcombinations and modified embodiments are explicitly set forth herein. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of additive manufacture in which an object or part object is printed on a wax base, the method comprising:
   providing a layer of wax on a surface of a printing tray, said wax being heated to above a melting point thereof such that wax in contact with said printing tray is molten;
   cooling said wax while continually pressing on said wax, therewith to form said wax base, from said molten layer of wax, said wax base being formed on said printing tray, and using additive manufacture to print an object on said wax base.

2. The method of claim 1, comprising applying said layer of wax and subsequently heating said wax to above said melting point.

3. The method of claim 1, wherein said surface of said printing tray is roughened.

4. The method of claim 3, wherein said roughening is carried out using sandblasting, or wherein said printing tray is constructed using unfinished aluminum.

5. The method of claim 1, wherein said wax base comprises a first layer of wax having a first melting point and a second layer of wax having a second melting point, said first melting point being lower than said second melting point and said first layer being in contact with said surface, said wax being heated to be above said first melting point but below said second melting point.

6. The method of claim 1, further comprising printing ribs over said wax base to prevent said wax base from warping.

7. The method of claim 1, comprising cutting or molding the wax base into a series of full thickness sections separated by thin intervening sections.

8. The method of claim 1, comprising printing a frame around said tray, wherein said providing a layer of wax comprising filling an interior of said frame with molten wax.

9. The method of claim 1, wherein said cooling is carried out over a time period of between half an hour and ten hours.

10. The method of claim 9, wherein a layer less than a millimeter in thickness of wax is melted and wherein said cooling is carried out over a time period exceeding one hour.

11. The method of claim 9, wherein a layer of at least five millimeters in thickness is melted and wherein said cooling is carried out over a time period exceeding four hours.

* * * * *